US011706693B2

(12) United States Patent
Hua et al.

(10) Patent No.: US 11,706,693 B2
(45) Date of Patent: *Jul. 18, 2023

(54) SYSTEMS AND METHODS FOR DETERMINING A USER EQUIPMENT BATTERY LEVEL

(71) Applicant: Verizon Patent and Licensing Inc., Basking Ridge, NJ (US)

(72) Inventors: Suzann Hua, Walnut Creek, CA (US); Ye Huang, San Ramon, CA (US); Imtiyaz Shaikh, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 121 days.

This patent is subject to a terminal disclaimer.

(21) Appl. No.: 17/249,533

(22) Filed: Mar. 4, 2021

(65) Prior Publication Data

US 2021/0195502 A1   Jun. 24, 2021

Related U.S. Application Data

(63) Continuation of application No. 16/549,167, filed on Aug. 23, 2019, now Pat. No. 10,959,161.

(51) Int. Cl.
*H04W 48/08* (2009.01)
*H04W 52/02* (2009.01)
*H04W 60/00* (2009.01)
*H04W 76/50* (2018.01)
*H04W 8/08* (2009.01)

(52) U.S. Cl.
CPC ............ *H04W 48/08* (2013.01); *H04W 8/08* (2013.01); *H04W 52/0261* (2013.01); *H04W 60/00* (2013.01); *H04W 76/50* (2018.02)

(58) Field of Classification Search
CPC ... H04W 48/08; H04W 52/0261; H04W 8/08; H04W 76/50; H04W 60/00; H04W 24/02; H04W 24/08; H04W 36/00837; H04W 36/0094; H04L 43/0817
See application file for complete search history.

(56) References Cited

U.S. PATENT DOCUMENTS

2009/0098914 A1 * 4/2009 Martin-Cocher ............................ H04W 52/0264 307/130
2017/0153694 A1   6/2017 Baldwin et al.
(Continued)

FOREIGN PATENT DOCUMENTS

JP   2010-081342   4/2010

OTHER PUBLICATIONS

3GPP TR 23.791 V16.2.0 (Jun. 2019); 3rd Generation Partnership Project; Technical Specification Group Services and System Aspects; Study of Enablers for Network Automation for 5G (Release 16) (Year: 2019).*

(Continued)

*Primary Examiner* — Mohammed S Chowdhury

(57) ABSTRACT

An application function (AF) device may identify a user equipment (UE) and may send, to a network exposure function (NEF) device, a battery level request message concerning a battery of the UE. The AF device may obtain, from the NEF device, based on sending the battery level request message, a battery level report, and may cause, based on the battery level report, at least one action to be performed.

20 Claims, 9 Drawing Sheets

(56) References Cited

U.S. PATENT DOCUMENTS

| | | |
|---|---|---|
| 2018/0096405 A1 | 4/2018 | Cho et al. |
| 2018/0103426 A1 | 4/2018 | Nacer et al. |
| 2019/0150081 A1 | 5/2019 | Qiao et al. |
| 2019/0364541 A1 | 11/2019 | Ryu |
| 2019/0377399 A1* | 12/2019 | Cannell ............. H04W 52/0261 |
| 2020/0112868 A1 | 4/2020 | Shariat et al. |
| 2020/0112921 A1 | 4/2020 | Han et al. |
| 2020/0229079 A1 | 7/2020 | Lee et al. |
| 2020/0267679 A1 | 8/2020 | Kim |
| 2020/0314729 A1 | 10/2020 | Kwok et al. |
| 2022/0039046 A1* | 2/2022 | Ianev .................. H04L 43/0817 |
| 2022/0070963 A1* | 3/2022 | Ianev .................... H04L 43/065 |

OTHER PUBLICATIONS

3GPP TS 23.502 V16.1.1 (Jun. 2019); 3rd Generation Partnership Project; Technical Specification Group Services and System Aspects; Procedures for the 5G System; Stage 2; (Year: 2019).*

SA WG2 Meeting #128; S2-186921, Jul. 2-6, 2018, Vilnius, Lithuania (revision of S2-18xxxx); Source: Lenovo, Motorola Mobility; Title: New Key Issue: UE driven analytics sharing (Year: 2018).*

* cited by examiner

SYSTEMS AND METHODS FOR DETERMINING A USER EQUIPMENT BATTERY LEVEL

RELATED APPLICATION

This application is a continuation of U.S. patent application Ser. No. 16/549,167, entitled "SYSTEMS AND METHODS FOR DETERMINING A USER EQUIPMENT BATTERY LEVEL" filed Aug. 23, 2019 (now U.S. Pat. No. 10,959,161), which is incorporated herein by reference.

BACKGROUND

A user equipment (UE) registers with a core network of a 5G wireless telecommunications network to receive 5G services. The UE may send an initial registration request message (e.g., when the UE first connects to the 5G network), a mobility registration request message (e.g., when a capability and/or characteristic of the UE changes), a periodic registration request message (e.g., to maintain a connection to the 5G network), an emergency registration request message (e.g., to access 5G services for an emergency), and/or the like to the core network to register with the 5G network.

DETAILED DESCRIPTION OF PREFERRED EMBODIMENTS

Figure 1A:
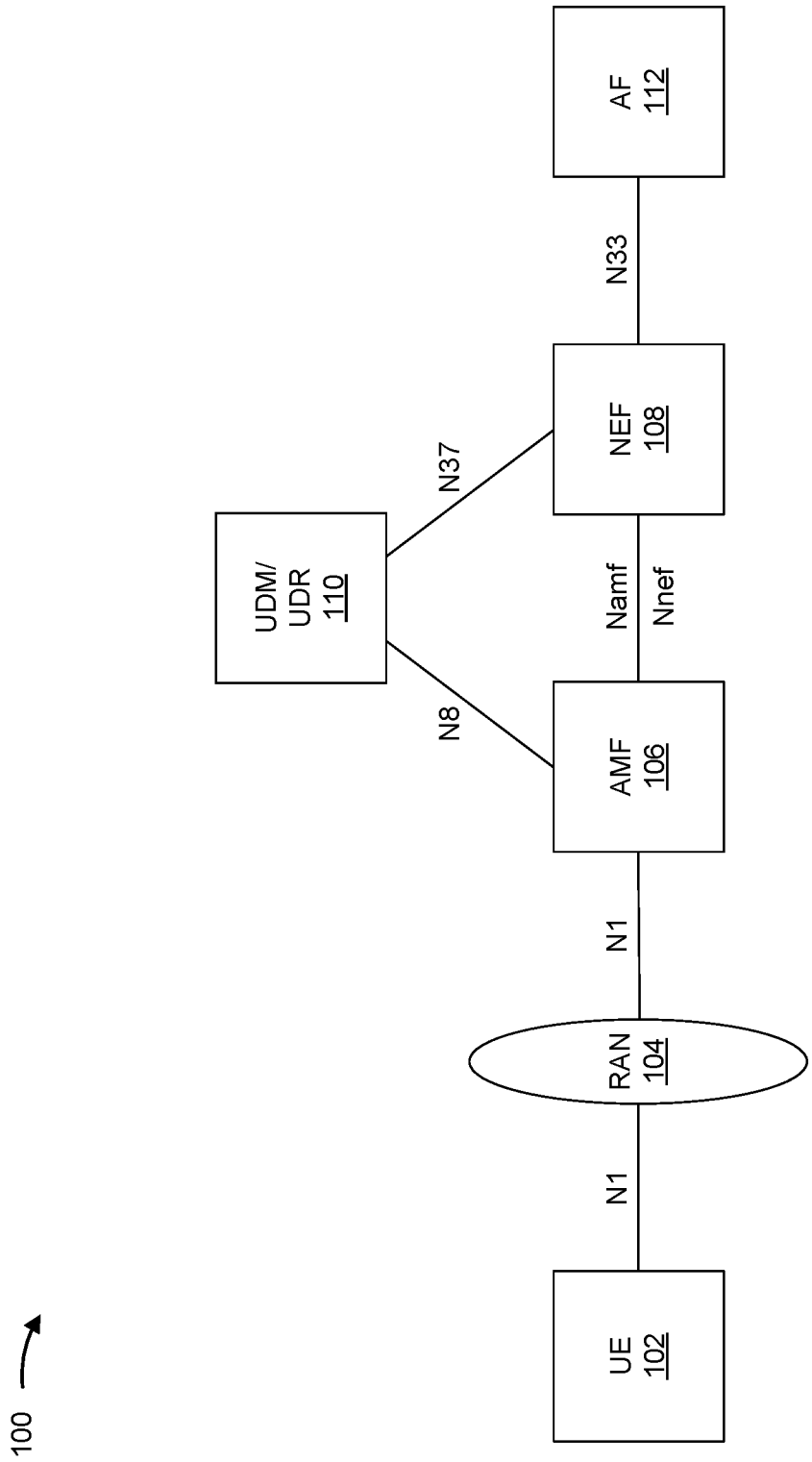
FIGS. 1A-1E are diagrams of one or more example implementations described herein.

The following detailed description of example implementations refers to the accompanying drawings. The same reference numbers in different drawings may identify the same or similar elements.

In many instances, a user equipment (UE) may send a registration request message to a network function (NF) device of a core network of a 5G wireless telecommunications network to register the UE to receive 5G services. The UE may send an initial registration request message (e.g., when the UE first connects to the 5G network), a mobility registration request message (e.g., when a capability and/or characteristic of the UE changes), a periodic registration request message (e.g., to maintain a connection to the 5G network), an emergency registration request message (e.g., to access 5G services for an emergency), and/or the like to register and/or maintain a registration with the 5G network. Moreover, the NF device of the core network may send a registration accept message (e.g., a message indicating that the NF device received the registration request message) to the UE, such as an initial registration accept message, a mobility registration request message, a periodic registration accept message, an emergency registration accept message, and/or the like. The registration accept message may be the same type as the registration request message (e.g., an initial registration accept message may be sent based on receiving an initial registration request message, a mobility registration accept message may be sent based on receiving a mobility registration request message, and/or the like).

In some cases, an application function (AF) device of the 5G wireless telecommunications network may need to communicate with a UE that is registered with the 5G network (e.g., to send data associated with a software update, to obtain data collected by the UE, and/or the like). Moreover, in some cases, communicating with the AF device may diminish a battery level of a battery of the UE (e.g., the UE may consume power in the battery to enable the UE to receive or send a data transfer). Communicating with the AF device may drain the battery of the UE to a battery level that limits the ability of the UE to function as intended (e.g., the battery may become dead and the UE may not be able to function, the battery level may become reduced to a level such that the UE does may not have enough power to perform an intended operation, and/or the like). Moreover, in some cases, a specialized UE, such as an internet of things (IoT) device, may not be programmed to send messages regarding a battery level of a battery of the UE, so the AF device may not be able to obtain information concerning the battery level of the battery of the UE before determining to communicate with the UE.

Some implementations described herein expand the registration process for a UE to register with a 5G network to allow the UE to send a battery level report to an AF device. In some implementations, the AF device may send a battery level request concerning a battery of the UE to a network exposure function (NEF) device, which may cause a profile concerning the UE to be updated in a data structure. In some implementations, an access and mobility management function (AMF) device may obtain profile information concerning the UE and may receive a registration request message from the UE. In some implementations, the AMF device may generate and send, based on the profile information and the registration request message, a registration accept message that includes a battery level report request concerning a battery of the UE to the UE. In some implementations, the UE may determine, based on the battery level report request, a battery level of the battery of the UE, and may generate and send an additional registration request message that includes a battery level report concerning the battery of the UE to the AMF device. In some implementations, the AMF device may identify the battery level report in the additional registration request message and may send the battery level report to the AF device via the NEF device. In some implementations, the AF device may cause (e.g., by sending one or more instructions to a different device), based on the battery level report, one or more actions to be performed. Such actions may include recharging or replacing the battery of the UE.

In this way, some implementations allow the UE to send battery level information concerning the battery of the UE to the AF using the existing UE registration process (e.g., by including a battery level report in a registration request message, a battery level report request in a registration accept message, and/or the like). This allows the AF device to obtain the battery level information, which in turn may cause one or more actions to be taken, such as recharging or replacing the battery of the UE, which increases a likelihood that the battery of the UE will have enough charge to support a data transfer between the UE and the AF device and/or that the UE will have enough charge to perform an intended function. This also allows the AF device to obtain the battery level information by utilizing existing interfaces (e.g. interfaces that support communicating registration request messages, registration accept messages, and/or the like) between devices of the 5G network, rather than establishing new interfaces for conveying the battery level information to the AF device. Moreover, enabling a UE device to transmit the battery level information in a registration request message conserves resources (e.g., processing resources, memory resources, power resources, networking resources, and/or the like) that would otherwise be used by the UE to generate and/or send a standalone battery level information message.

FIGS. 1A-1E are diagrams of one or more example implementations 100 described herein. Example implementation(s) may include a user equipment (UE), a radio access network (RAN), and/or one or more network function (NF) devices of a wireless telecommunications system, such as a 5G wireless telecommunications system. For example, as shown in FIG. 1A, example implementation(s) 100 may include a UE 102, a RAN 104, an access and mobility management function (AMF) device 106, a network exposure function (NEF) device 108, a unified data management (UDM) device and/or a unified data repository (UDR) device (UDM/UDR device 110), and/or an application function (AF) device 112.

As shown in FIG. 1A, one or more of the UE 102, the RAN 104, and/or the NF devices may be connected to each other via various connections. For example, connection(s) N1 may connect the UE 102, the RAN 104, and/or the AMF device 106. Connection N8 may connect the AMF device 106 and the UDM/UDR device 110. Connection N37 may connect the UDM/UDR device 110 and the NEF device 108. Connection Namf may connect the NEF device 108 to the AMF device 106 (e.g., to allow the NEF device 108 to send information to the AMF device 106) and connection Nnef may connect the AMF device 106 to the NEF device 108 (e.g., to allow the AMF device 106 to send information to the NEF device 108). Connection N33 may connect the NEF device 108 to the AF device 112.

In some implementations, the UDM/UDR device 110 may be separated into two devices, a UDM device and a UDR device, connected by a connection N35 (not shown in FIG. 1A). In that case, connection N8 may connect the UDM device and the AMF device 106 and connection N37 may connect the UDR device and the NEF device 108.

Figure 1B:
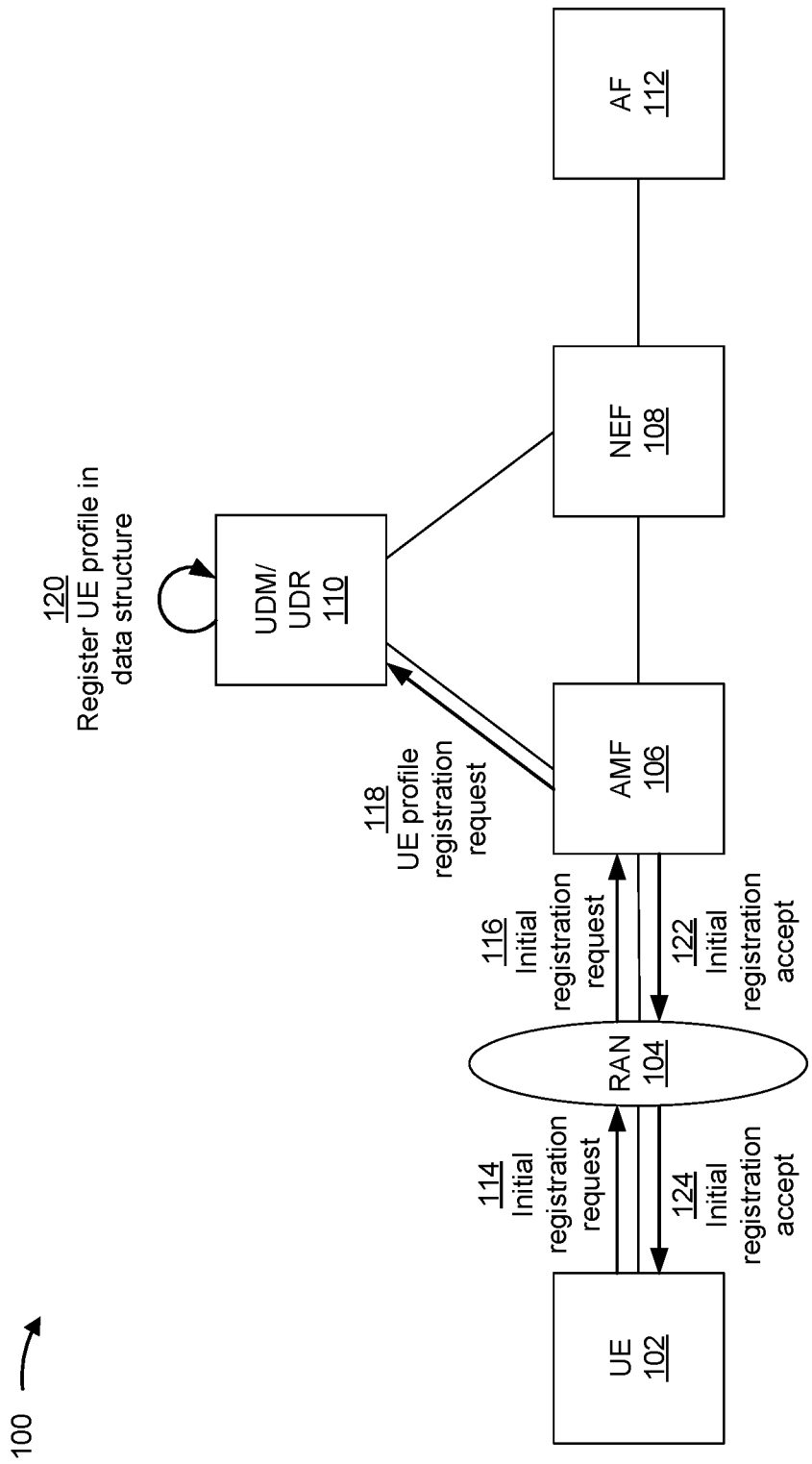

As shown in FIG. 1B and by reference numbers 114 and 116, the UE may generate and send an initial registration request message to the AMF device 106 via the RAN 104 (e.g., via connection N1). The initial registration request message may include information that identifies the UE 102 (e.g., a string that identifies the UE 102), information that indicates one or more capabilities of the UE 102 (e.g., one or more communication capabilities of the UE 102), information that indicates one or more characteristics of the ULE 102 (e.g., a location of the UE 102, a movement of the UE 102, and/or the like), and/or the like. The AMF device 106 may process the initial registration request message to generate a UE profile registration request message (e.g., a request message to create a profile concerning the UE 102 in a data structure) that includes the information that identifies the UE 102, the information that indicates the one or more capabilities of the UE 102, the information that indicates the one or more characteristics of the UE 102, and/or the like. As shown by reference number 118, the AMF device may send the UE profile registration request message to the UDM/UDR device 110 (e.g., via connection N8). As shown by reference number 120, the UDM/UDR device 110 may register, based on the UE profile registration request message, a profile concerning the UE 102 in a data structure (e.g., a data structure associated with the UDM/UDR device 110). The profile may indicate the information that identifies the UE 102, the information that indicates the one or more capabilities of the UE 102, the information that indicates the one or more characteristics of the UE 102, and/or the like. Additionally, or alternatively, when a separate UDM device is connected to a separate UDR device, the AMF device 106 may send the UE profile registration request message to the UDM device (e.g., via connection N8), the UDM device may send the UE profile registration request message to the UDR device (e.g., via connection N35), and the UDR device may register a profile concerning the UE 102 in a data structure (e.g., a data structure associated with the UDR device).

As shown by reference numbers 122 and 124, the AMF device 106 may generate and send an initial registration accept message to the UE 102 via the RAN 104 (e.g., via connection N1). The initial registration accept message may indicate that the AMF device 106 received the initial registration request message, the AMF device 106 generated and/or sent the UE profile registration request message, and/or the like.

Figure 1C:
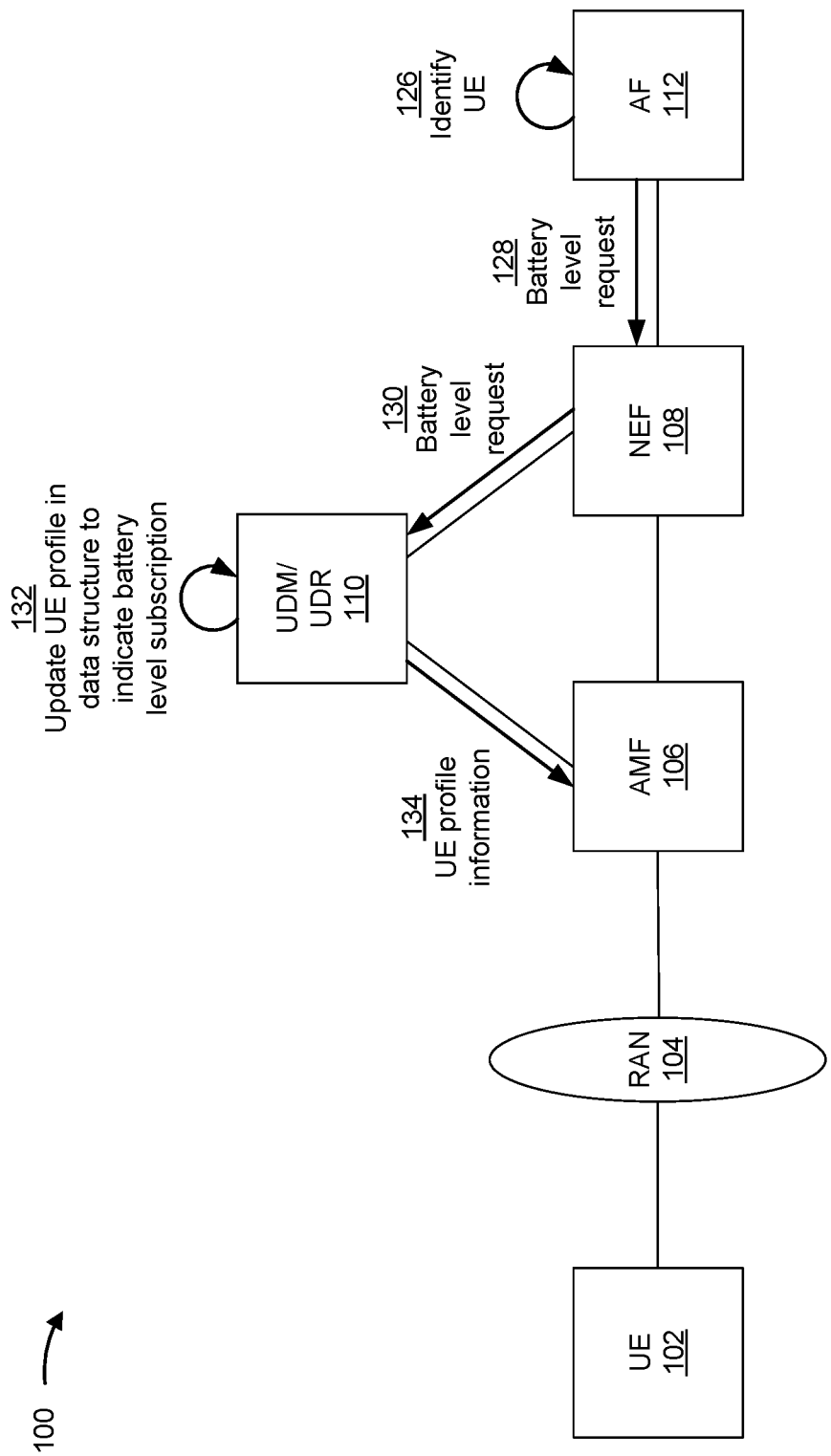

As shown in FIG. 1C and by reference numbers 126, the AF device 112 may identify a UE (e.g., UE 102) with which to communicate (e.g., to send a software update to, to obtain data from, and/or the like). As shown by reference number 128, the AF device 112 may generate and send a battery level request message concerning a battery of the UE to the NEF device 108 (e.g., via connection N33). The battery level request message may include information that identifies the UE and/or information that indicates a battery level threshold (e.g., a threshold in terms of a battery level of the battery of the UE, such as a 10% battery level). As shown by reference number 130, the NEF device 108 may send the battery level request message to the UDM/UDR device 110 (e.g., via connection N37). As shown by reference number 132, the UDM/UDR device 110 may update, based on the battery level request message, the profile concerning the UE in the data structure to indicate a battery level subscription (e.g., update the profile to indicate that the AF device 112 wants updates concerning a battery level of the battery of the UE, such as whether the battery level satisfies (e.g., is less than or equal to) the battery level threshold). As shown by reference number 134, the UDM/UDR device 110 may generate and send profile information concerning the UE to the AMF device 106 (e.g., via connection N8). The profile information may indicate an identifier of the UE, one or more capabilities of the UE, one or more characteristics of the UE, a battery level subscription concerning the battery of the UE (e.g., that indicates the battery level threshold), and/or the like. Additionally, or alternatively, when a separate UDM device is connected to a separate UDR device, the NEF device 108 may send the battery level request message to the UDR device (e.g., via connection N37), the UDR device may update the profile concerning the UE in the data structure to indicate a battery level subscription, the UDR may generate and send profile information concerning the UE to the UDM device (e.g., via connection N35), and the UDM device may send the profile information concerning the UE to the AMF device 106 (e.g., via connection N8).

Figure 1D:
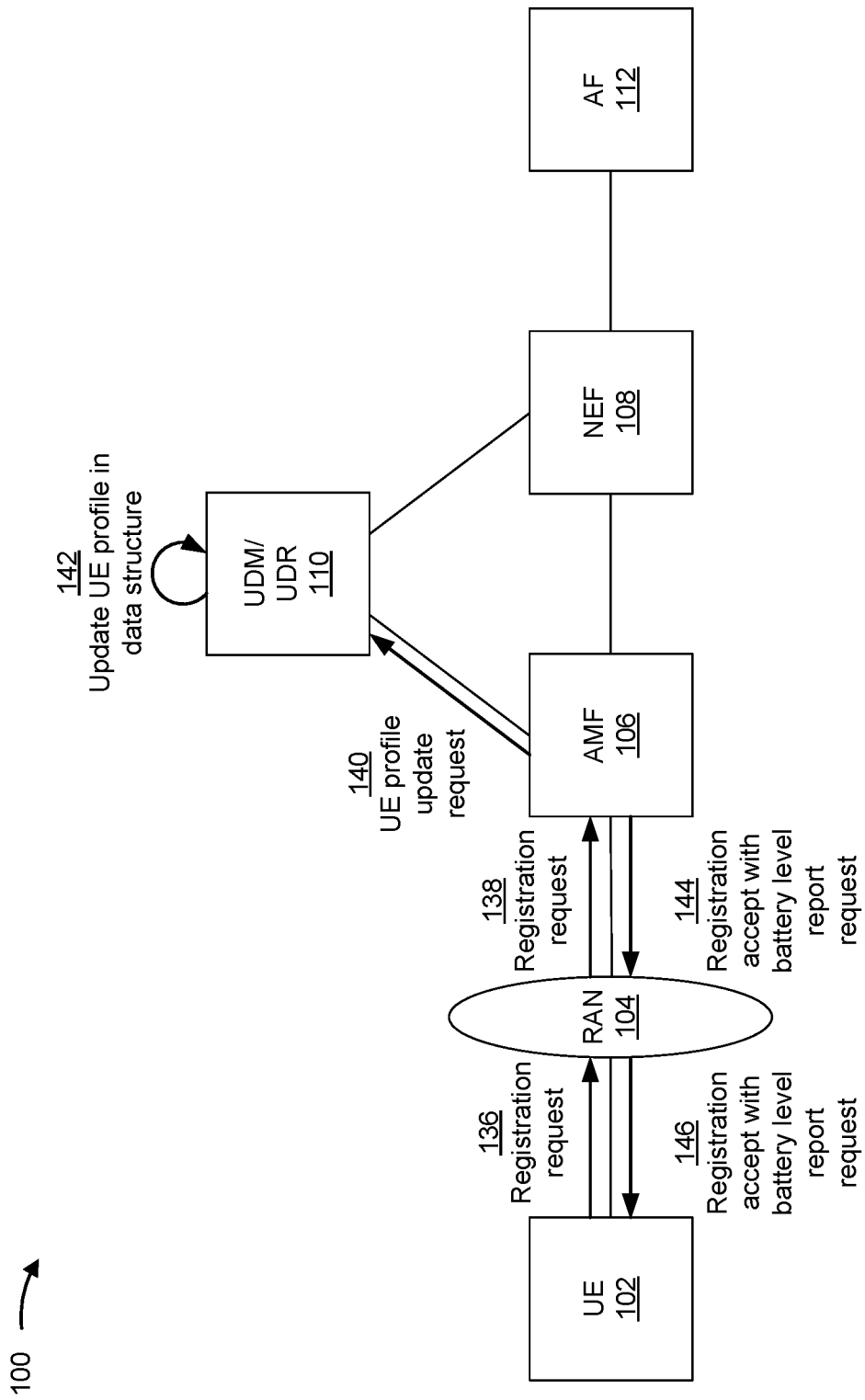

As shown in FIG. 1D and by reference numbers 136 and 138, the UE 102 may generate and send a registration request message to the AMF device 106 via the RAN 104 (e.g., via connection N1). The registration request message may be an initial registration request message, a mobility registration request message, a periodic registration request message, an emergency registration request message, and/or the like. The registration request message may include information that identifies the UE 102, information that indicates one or more capabilities of the UE 102, information that indicates one or more characteristics of the UE 102, and/or the like. For example, the registration request message may indicate that the UE 102 is capable of determining a battery level of the battery of the UE 102. The AMF device may process the registration request message to generate a UE profile update request message (e.g., a request message to update the profile concerning the UE 102 in the data structure) that includes the information that identifies the UE 102, the information that indicates the one or more capabilities of the UE 102, the information that indicates the one or more characteristics of the UE 102, and/or the like. As shown by reference number 140, the AMF device 106 may send the UE profile update request message to the UDM/UDR device 110 (e.g., via connection N8). As shown by reference number 142, the UDM/UDR device 110 may update, based on the UE profile update request message, the profile concerning the UE 102 in the data structure (e.g., the data structure associated with the UDM/UDR device 110). Additionally, or alternatively, when a separate UDM device is connected to a separate UDR device, the AMF device 106 may send the UE profile update request message to the UDM device (e.g., via connection N8), the UDM device may send the UE profile update request message to the UDR device (e.g., via connection N35), and the UDR device may update the profile concerning the UE 102 in the data structure (e.g., the data structure associated with the UDR device).

In some implementations, the AMF device 106 may generate, based on the profile information that indicates the battery level subscription concerning the battery of the UE 102 (e.g., received from the UDM/UDR device 110, or, alternatively, the UDM device) and/or the registration request message, a registration accept message. The registration accept message may be an initial registration accept message, a mobility registration accept message, a periodic registration accept message, an emergency registration accept message, and/or the like (e.g., a corresponding type of registration accept message to the type of the registration request message). The registration accept message may indicate that the AMF device 106 received the registration request message, the AMF device 106 generated and/or sent the UE profile update request message, and/or the like. In some implementations, the registration accept message may include a battery level report request concerning the battery of the UE 102 (e.g., a request for the UE 102 to determine a battery level of the battery of the UE 102). The battery level report request may indicate the battery level threshold (e.g., to allow the UE 102 to determine whether the battery level satisfies (e.g., is less than or equal to) the battery level threshold). As shown by reference numbers 144 and 146, the AMF device 106 may send the registration accept message to the UE 102 via the RAN 104 (e.g., via connection N1).

Figure 1E:
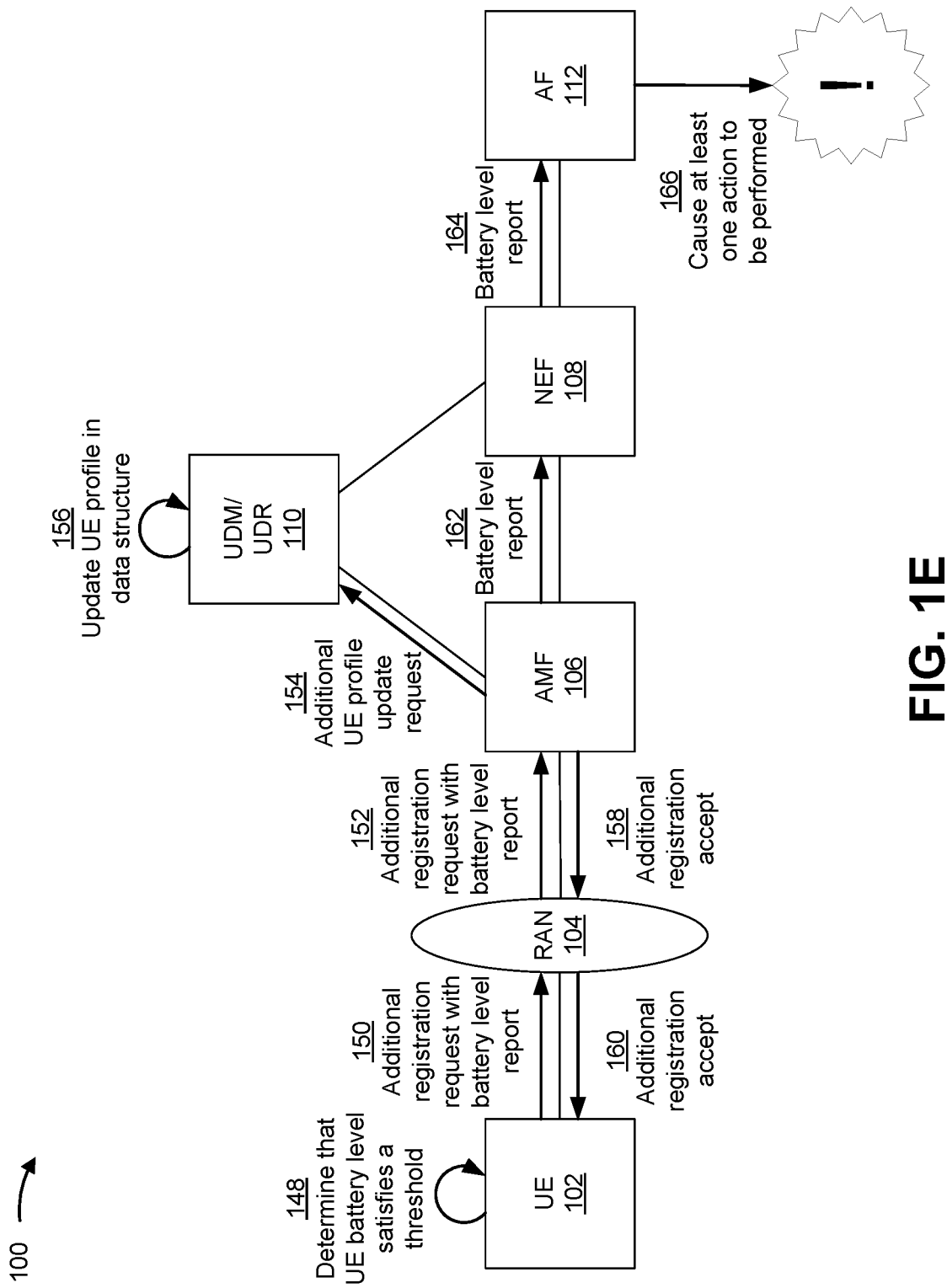

As shown in FIG. 1E and by reference number 148, the UE 102, based on the registration accept message, may determine that a battery level of the battery of the UE 102 satisfies the battery level threshold. For example, the UE 102 may determine that the battery level is less than or equal to the battery level threshold. As shown by reference numbers 150 and 152, the UE 102 may generate and send an additional registration request message to the AMF device 106 via the RAN 104 (e.g., via connection N1). The additional registration request message may be an initial registration request message, a mobility registration request message, a periodic registration request message, an emergency registration request message, and/or the like. The registration request message may include information that identifies the UE 102, information that indicates one or more capabilities of the UE 102, information that indicates one or more characteristics of the UE 102, and/or the like. For example, the additional registration request message may include a battery level report concerning the battery of the UE 102. The battery level report may indicate a battery level of the battery of the UE 102 and/or whether the battery level of the battery satisfies the battery level threshold. The AMF device 106 may process (e.g., parse) the additional registration request message to identify the battery level report and/or the information that identifies the UE 102, the information that indicates the one or more capabilities of the UE 102, the information that indicates the one or more characteristics of the UE 102, and/or the like. The AMF device 106 may generate an additional UE profile update request message (e.g., an additional request message to update the profile concerning the UE 102 in the data structure) that includes the information that identifies the UE 102, the information that indicates the one or more capabilities of the UE 102, the information that indicates the one or more characteristics of the UE 102, and/or the like. As shown by reference number 154, the AMF device 106 may send the additional UE profile update request message to the UDM/UDR device 110 (e.g., via connection N8). As shown by reference number 156, the UDM/UDR device 110 may update, based on the additional UE profile update request message, the profile concerning the UE 102 in the data structure (e.g., the data structure associated with the UDM/UDR device 110). Additionally, or alternatively, when a separate UDM device is connected to a separate UDR device, the AMF device 106 may send the additional UE profile update request message to the UDM device (e.g., via connection N8), the UDM device may send the additional UE profile update request message to the UDR device (e.g., via connection N35), and the UDR device may update the profile concerning the UE 102 in the data structure (e.g., the data structure associated with the UDR device).

In some implementations, the AMF device 106 may generate, based on the additional registration request message, an additional registration accept message. The additional registration accept message may be an initial registration accept message, a mobility registration accept message, a periodic registration accept message, an emergency registration accept message, and/or the like (e.g., a corresponding type of registration accept message to the type of the additional registration request message). The additional registration accept message may indicate that the AMF device 106 received the initial registration request message, the AMF device 106 generated and/or sent the UE profile registration request message, the AMF device 106 received the battery level report, the AMF device 106 sent the battery level report (e.g., to the NEF device 108, as described herein) and/or the like. As shown by reference numbers 158 and 160, the AMF device 106 may send the additional registration accept message to the UE 102 via the RAN 104 (e.g., via connection N1).

As shown by reference number 162, the AMF device 106 may send, after identifying the battery level report in the additional registration request, the battery level report to the NEF device 108 (e.g., via connection Nnef). As shown by reference number 164, the NEF device 108 may send the battery level report to the AF device 112 (e.g., via connection N33).

As shown by reference number 166, the AF device 112 may cause at least one action to be performed (e.g., based on the battery level report), such as cause a service technician to be dispatched to service the battery of the UE 102, cause the battery of the UE 102 to be recharged by a battery charger, cause a scheduled data transmission to or from the UE 102 to be cancelled or confirmed, and/or the like. For example, the AF device 112 may determine, based on the battery level report, that the battery level of the battery of the UE 102 satisfies (e.g., is less than or equal to) the battery level threshold, which may indicate that the battery needs to be recharged (e.g., because the battery level is low) and/or replaced (e.g., because the battery cannot hold a charge, the battery is malfunctioning, and/or the like). Accordingly, the AF device 112 may send one or more instructions (e.g., one or more computer code instructions, one or more human readable instruction messages, and/or the like) to a client device (e.g., a device that manages servicing of the UE 102) to dispatch a service technician to recharge or replace the battery of the UE 102. As another example, the AF device 112 may identify a battery charger associated with the UE 102 (e.g., by searching the data structure associated with the UDM/UDR device 110 or the UDR device) and may cause the battery charger associated with the UE 102 to charge the battery of the UE 102 (e.g., by sending one or more instructions to the battery charger and/or a device that controls the battery charger).

In another example, the AF device 112 may determine, based on the battery level report, that the battery level of the battery of the UE 102 satisfies (e.g., is less than or equal to) the battery level threshold, which may indicate that the battery of the UE 102 does not have enough charge to allow the UE 102 to receive or send a data transfer. Accordingly, the AF device 112 may identify, based on determining that the battery level of the battery of the UE 102 satisfies the battery level threshold, a scheduled data transmission to or from the UE 102 (e.g., by searching a data structure associated with scheduled data transmissions) and may cause the scheduled data transmission to be canceled (e.g., by sending one or more instructions to a device that schedules and/or manages data transmissions). Additionally, or alternatively, the AF device 112 may determine, based on the battery level report, a battery level of the battery of the UE 102 and may cause the scheduled data transmission to be confirmed. For example, the AF device 112 may determine that the battery level does not satisfy (e.g., is greater than) a critical battery level threshold (e.g., a battery level at which the battery is at risk of having no charge) and may cause the scheduled data transmission to be confirmed (e.g., by sending one or more instructions to a device that schedules and/or manages data transmissions). As another example, the AF device 112 may determine a size of the scheduled data transmission (e.g., in terms of kilobytes, megabytes, and/or the like) and may determine, based on the battery level, that the battery has enough charge to allow the UE 102 to receive or send a data transfer associated with the scheduled data transmission and therefore may cause the scheduled data transmission to be confirmed.

As indicated above, FIGS. 1A-1E are provided merely as examples. Other examples may differ from what is described with regard to FIGS. 1A-1E. Further, the number and arrangement of devices and networks shown in FIGS. 1A-1E are provided as an example. In practice, there may be additional devices and/or networks, fewer devices and/or networks, different devices and/or networks, or differently arranged devices and/or networks than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) of example implementation 100 may perform one or more functions described as being performed by another set of devices of example implementation 100.

Figure 2:
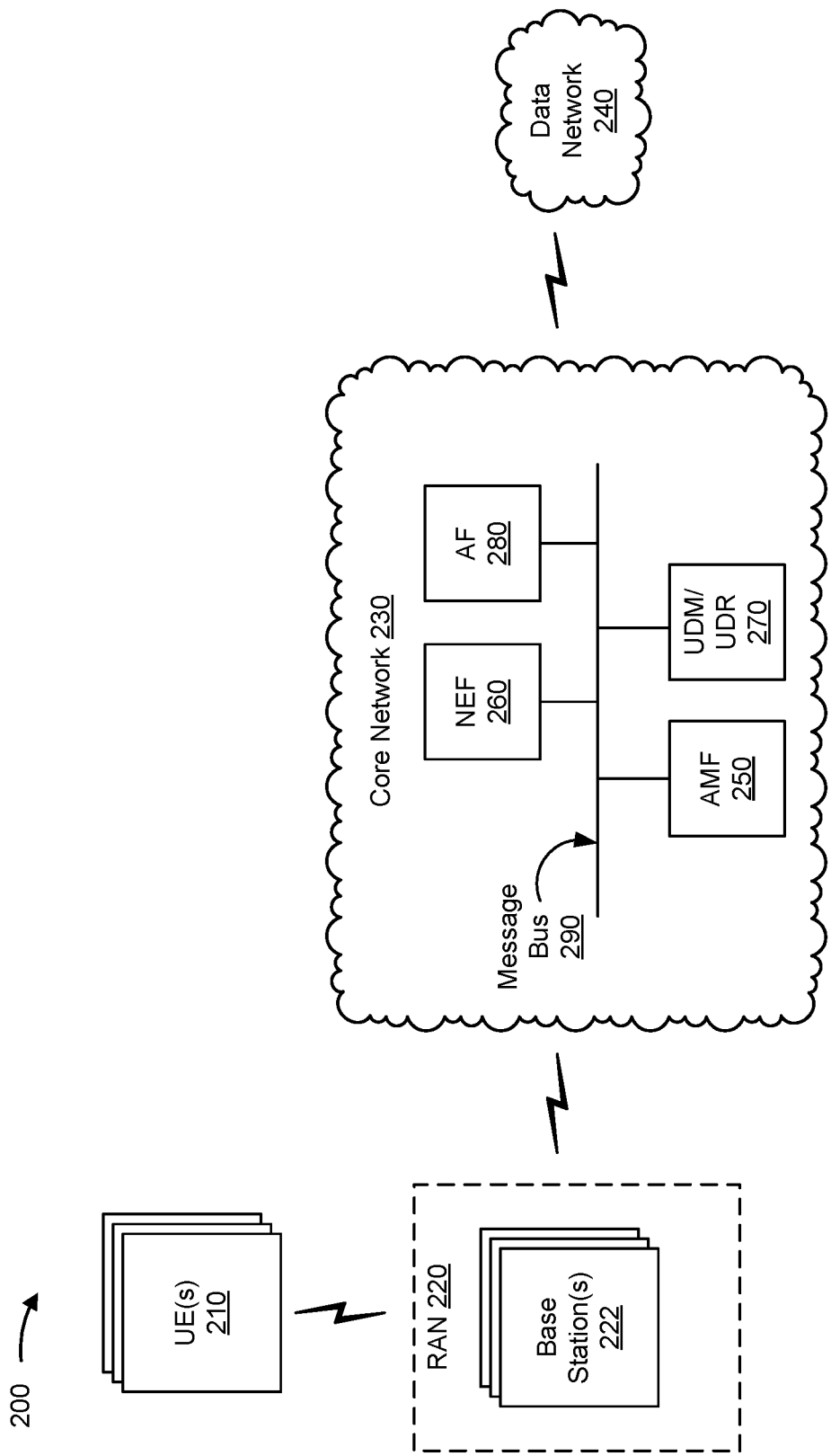
FIG. 2 is a diagram of an example environment in which exemplary systems and/or methods described herein may be implemented.

FIG. 2 is a diagram of an example environment 200 in which systems, functional elements, and/or methods, described herein, can be implemented. As shown in FIG. 2, environment 200 may include one or more UEs 210, a radio access network (RAN) 220 that includes one or more base stations 222, a core network 230, and one or more data networks 240. The core network may be a 5G NG core network included in a 5G wireless telecommunications system and may include various network function (NF) devices, such as an access and mobility management function (AMF) device 250, a network exposure function (NEF) device 260, a unified data management (UDM)/unified data repository (UDR) device 270, and/or an application function (AF) device 280. The NF devices may be communicatively connected via message bus 290. Devices of environment 200 may interconnect via wired connections, wireless connections, or a combination of wired and wireless connections.

UE 210 includes one or more devices capable of communicating with RAN 220 and/or base stations 222 and/or data network 240 (e.g., via core network 230). For example, UE 210 may include a wireless communications device, a radiotelephone, a personal communications system (PCS) terminal (e.g., that can combine a cellular radiotelephone with data processing and data communications capabilities), a smart phone, a laptop computer, a tablet computer, a personal gaming system, a mobile hotspot device, a fixed wireless access device, a customer premises equipment, and/or a similar device. In some implementations, UE 210 may include an Internet of Things (IoT) UE, such as a narrowband IoT (NB-IoT) UE, a Cat-M1 IoT UE, and/or the like. UE 210 may be capable of communicating using uplink (e.g., UE 210 to base station 222) communications, downlink (e.g., base station 222 to UE 210) communications, and/or sidelink (e.g., UE-to-UE) communications. In some implementations, UE 210 may include a machine-type communication (MTC) UE, such as an evolved or enhanced MTC (eMTC) UE. In some implementations, UE 210 may be capable of communicating using multiple radio access technologies (RATs).

RAN 220 includes one or more base stations 222 capable of communicating with UE 210 using a cellular RAT. For example, base station 222 may include a base transceiver station, a radio base station, a node B, an eNB, a gNB, a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. Base station 222 may transfer traffic between UE 210 (e.g., using a cellular RAT), other base stations 222 (e.g., using a wireless interface or a backhaul interface, such as a wired or optical backhaul interface), and/or core network 230. Base station 222 may provide one or more cells that cover geographic areas. Some base stations 222 may be mobile base stations. Some base stations 222 may be capable of communicating using multiple RATs.

Core network 230 includes various types of core network architectures, such as a 5G NG Core, a long-term evolution (LTE) evolved packet core (EPC), and/or the like of a wireless telecommunications system. In some implementations, core network 230 can be implemented on physical devices, such as a gateway, a mobility management entity, and/or the like. In some implementations, the hardware and/or software implementing core network 230 can be virtualized (e.g., through the use of network function virtualization and/or software-defined networking), thereby allowing for the use of composable infrastructure when implementing core network 230. In this way, networking, storage, and compute resources can be allocated to implement the functions of core network 230 in a flexible manner as opposed to relying on dedicated hardware and software to implement these functions.

Data network 240 includes one or more wired and/or wireless data networks. For example, data network 240 may include an IMS, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

AMF device 250 is a hardware-based device that may act as a termination point for Non Access Stratum (NAS) signaling, mobility management, and/or the like. NEF device 260 is a hardware-based device that may support the exposure of capabilities and/or events in the wireless telecommunications system to help other entities in the wireless telecommunications system discover network services. UDM/UDR device 270 is a hardware-based device that may store subscriber data and profiles concerning the wireless telecommunications system in a data structure and may provide and/or authorize access to the data and profiles. AF device 280 is a hardware-based device that may support application influence on traffic routing, access to a NEF device (e.g., NEF device 260), policy control, and/or the like.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
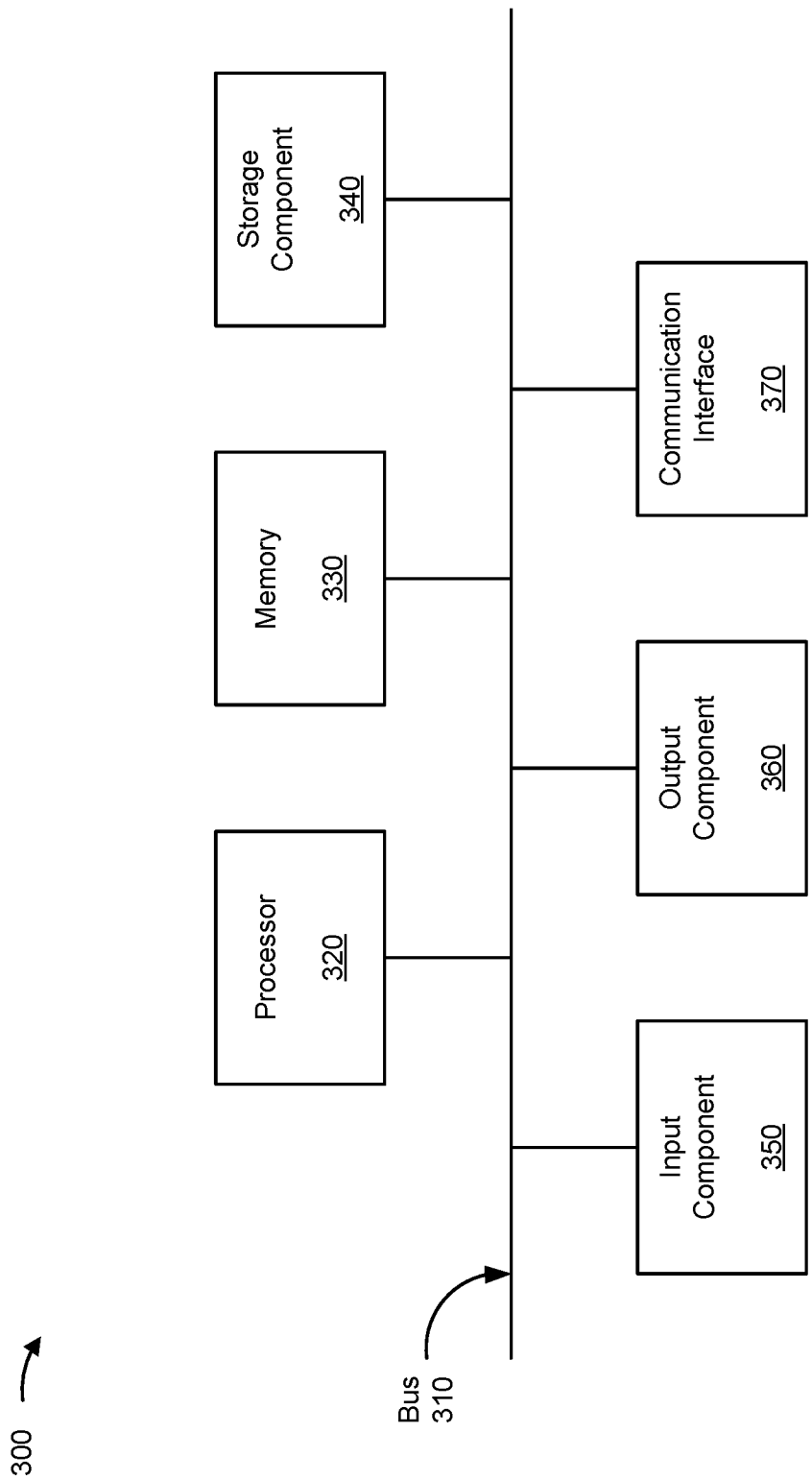
FIG. 3 is a diagram of example components of one or more exemplary devices of FIG. 2.

FIG. 3 is a diagram of example components of a device 300. Device 300 may correspond to UE 210, base station 222, one or more devices of core network 230, and/or data network 240, including AMF device 250, NEF device 260, UDM/UDR device 270, and/or AF device 280. In some implementations UE 210, base station 222, one or more devices of core network 230, and/or data network 240, including AMF device 250, NEF device 260, UDM/UDR device 270, and/or AF device 280 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
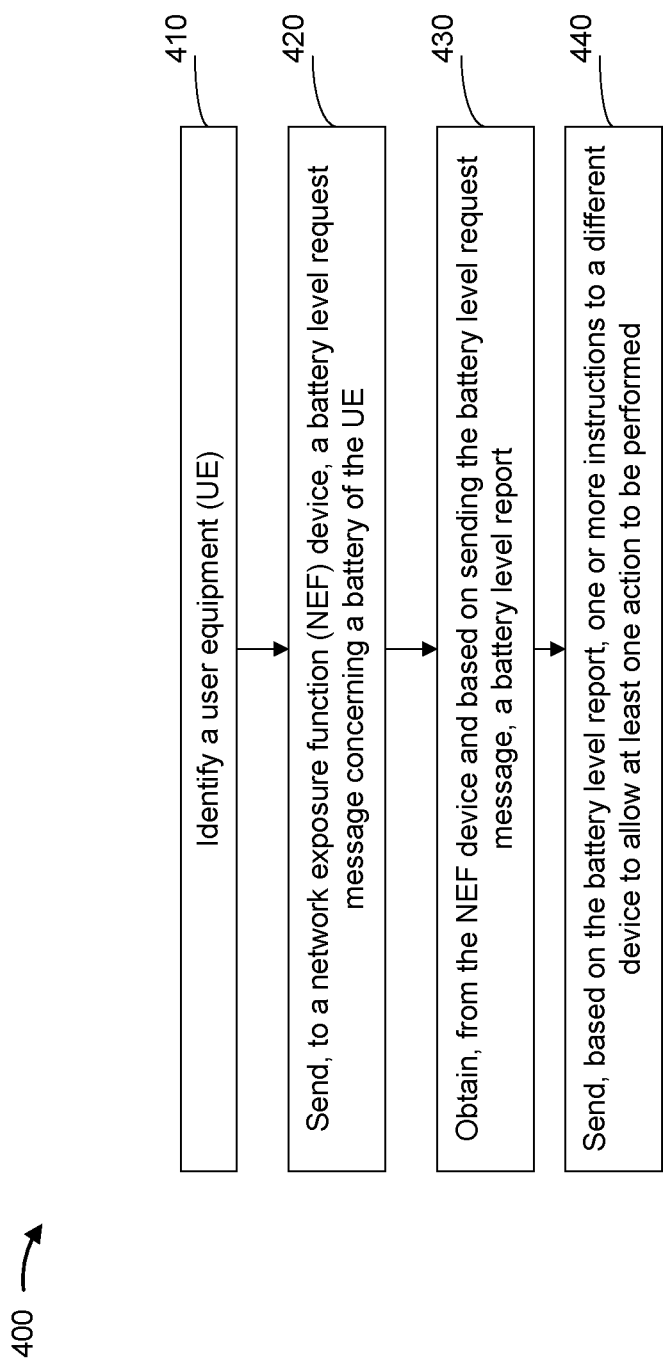
FIGS. 4-5 are flowcharts of example processes for determining a user equipment battery level.

FIG. 4 is a flow chart of an example process 400 for determining a user equipment battery level. In some implementations, one or more process blocks of FIG. 4 may be performed by an application function (AF) device (e.g., AF device 280). In some implementations, one or more process blocks of FIG. 4 may be performed by another device or a group of devices separate from or including the AF device, such as a user equipment (UE) (e.g., UE 210), a base station (e.g., base station 222), an access and mobility management function (AMF) device (e.g., AMF device 250), a network exposure function (NEF) device (e.g., NEF device 260), a unified data management (UDM)/unified data repository (UDR) device (e.g., UDM/UDR device 270), and/or the like.

As shown in FIG. 4, process 400 may include identifying a UE (block 410). For example, the AF device (e.g., using processor 320, memory 330, storage component 340, input component 350, output component 360, communication interface 370, and/or the like) may identify a UE, as described above.

As further shown in FIG. 4, process 400 may include sending, to an NEF device, a battery level request message concerning a battery of the UE (block 420). For example, the AF device (e.g., using processor 320, memory 330, storage component 340, input component 350, output component 360, communication interface 370, and/or the like) may send, to an NEF device, a battery level request message concerning a battery of the UE, as described above. The battery level request message may include information that identifies the UE and information that indicates a battery level threshold. In some implementations, sending the battery level request message to the NEF device causes the NEF device to send the battery level request message to a UDR device to permit the UDR device to update a profile concerning the UE in a data structure.

As further shown in FIG. 4, process 400 may include obtaining, from the NEF device and based on sending the battery level request message, a battery level report (block 430). For example, the AF device (e.g., using processor 320, memory 330, storage component 340, input component 350, output component 360, communication interface 370, and/or the like) may obtain, from the NEF device and based on sending the battery level request message, a battery level report, as described above. The battery level report may have been included in a registration request message sent from the UE to the NEF via an AMF device.

As further shown in FIG. 4, process 400 may include sending, based on the battery level report, one or more instructions to a different device to allow at least one action to be performed (block 440). For example, the AF device (e.g., using processor 320, memory 330, storage component 340, input component 350, output component 360, communication interface 370, and/or the like) may send, based on the battery level report, one or more instructions to a different device to allow at least one action to be performed, as described above. The different device may be a battery charger. For example, the AF device may identify a battery charger associated with the UE and may send the one or more instructions to the battery charger associated with the UE to allow the battery charger to charge the battery of the UE. In another example, the AF device may determine, based on the battery level report, that a battery level of the battery of the UE satisfies a battery level threshold; may identify, based on determining that the battery level of the battery of the UE satisfies the battery level threshold, a scheduled data transmission to or from the UE; and may send, based on determining that the battery level of the of the UE satisfies the battery level threshold, the one or more instructions to the different device to allow the scheduled data transmission to be canceled or to be confirmed.

Process 400 may include additional implementations, such as any single implementation or any combination of implementations described in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
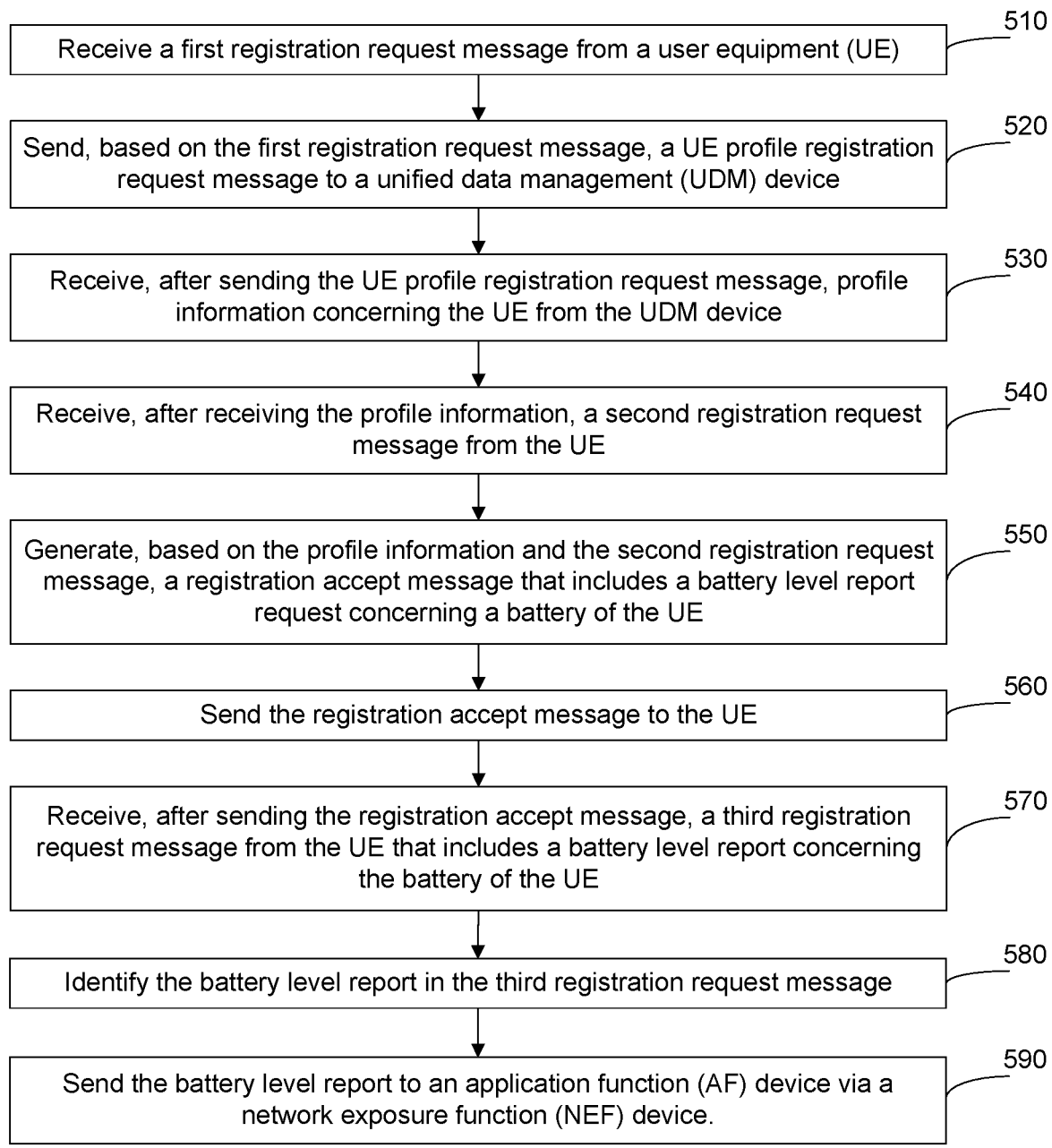

FIG. 5 is a flow chart of an example process 500 for determining a user equipment battery level. In some implementations, one or more process blocks of FIG. 5 may be performed by an access and mobility management function (AMF) device (e.g., AMF device 250). In some implementations, one or more process blocks of FIG. 5 may be performed by another device or a group of devices separate from or including the AMF device, such as a user equipment (UE) (e.g., UE 210), a base station (e.g., base station 222), a network exposure function (NEF) device (e.g., NEF device 260), a unified data management (UDM)/unified data repository (UDR) device (e.g., UDM/UDR device 270), an application function (AF) device (e.g., AF device 280), and/or the like.

As shown in FIG. 5, process 500 may include receiving a first registration request message from a UE (block 510). For example, the AMF device (e.g., using processor 320, memory 330, storage component 340, input component 350, output component 360, communication interface 370, and/or the like) may receive a first registration request message from a UE, as described above. The UE may be an internet of things device.

As further shown in FIG. 5, process 500 may include sending, based on the first registration request message, a UE profile registration request message to a UDM device (block 520). For example, the AMF device (e.g., using processor 320, memory 330, storage component 340, input component 350, output component 360, communication interface 370, and/or the like) may send, based on the first registration request message, a UE profile registration request message to a UDM device, as described above.

As further shown in FIG. 5, process 500 may include receiving, after sending the UE profile registration request message, profile information concerning the UE from the UDM device (block 530). For example, the AMF device (e.g., using processor 320, memory 330, storage component 340, input component 350, output component 360, communication interface 370, and/or the like) may receive, after sending the UE profile registration request message, profile information concerning the UE from the UDM device, as described above. The profile information may indicate a battery level subscription concerning the battery of the UE.

As further shown in FIG. 5, process 500 may include receiving, after receiving the profile information, a second registration request message from the UE (block 540). For example, the AMF device (e.g., using processor 320, memory 330, storage component 340, input component 350, output component 360, communication interface 370, and/or the like) may receive, after receiving the profile information, a second registration request message from the UE, as described above. The second registration request message may indicate that the UE is capable of determining a battery level of the battery of the UE.

As further shown in FIG. 5, process 500 may include generating, based on the profile information and the second registration request message, a registration accept message that includes a battery level report request concerning a battery of the UE (block 550). For example, the AMF device (e.g., using processor 320, memory 330, storage component 340, input component 350, output component 360, communication interface 370, and/or the like) may generate, based on the profile information and the second registration request message, a registration accept message that includes a battery level report request concerning a battery of the UE, as described above. The registration accept message may be an initial registration accept message, a mobility registration accept message, a periodic registration accept message, an emergency registration accept message, and/or the like. The battery level report request may indicate a battery level threshold.

As further shown in FIG. 5, process 500 may include sending the registration accept message to the UE (block 560). For example, the AMF device (e.g., using processor 320, memory 330, storage component 340, input component 350, output component 360, communication interface 370, and/or the like) may send the registration accept message to the UE, as described above. Sending the registration accept message to the UE causes the UE to determine whether a battery level of the UE satisfies a battery level threshold.

As further shown in FIG. 5, process 500 may include receiving, after sending the registration accept message, a third registration request message from the UE that includes a battery level report concerning the battery of the UE (block 570). For example, the AMF device (e.g., using processor 320, memory 330, storage component 340, input component 350, output component 360, communication interface 370, and/or the like) may receive, after sending the registration accept message, a third registration request message from the UE that includes a battery level report concerning the battery of the UE, as described above. The third registration request message may be an initial registration request message, a mobility registration request message, a periodic registration request message, an emergency registration request message, and/or the like. The battery level report may indicate a battery level of the battery of the UE.

As further shown in FIG. 5, process 500 may include identifying the battery level report in the third registration request message (block 580). For example, the AMF device (e.g., using processor 320, memory 330, storage component 340, input component 350, output component 360, communication interface 370, and/or the like) may identify the battery level report in the third registration request message, as described above. For example, the AMF device may parse the third registration request message to identify the battery level report and UE information; may generate, based on the UE information, a UE profile update request message; and may send the UE profile update request message to the UDM to update a profile concerning the UE in a data structure.

As further shown in FIG. 5, process 500 may include sending the battery level report to an application function (AF) device via a network exposure function (NEF) device (block 590). For example, the AMF device (e.g., using processor 320, memory 330, storage component 340, input component 350, output component 360, communication interface 370, and/or the like) may send the battery level report to an application function (AF) device via a network exposure function (NEF) device, as described above. Sending the battery level report to the AF device may permit the AF device to send one or more instructions to a different device to allow one or more actions to be performed. The one or more actions to be performed may include causing the battery of the UE to be recharged (e.g., by a battery charger), causing a service technician to be dispatched to service the battery of the UE, causing a scheduled data transmission to or from the UE to be canceled or confirmed, and/or the like.

Process 500 may include additional implementations, such as any single implementation or any combination of implementations described in connection with one or more other processes described elsewhere herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   sending, by a first device, a battery level request message concerning a battery of a user equipment (UE),
      wherein sending the battery level request message causes an update to a profile associated with the UE, to indicate a subscription to battery level information of the UE;
   receiving, by the first device and based on sending the battery level request message, a battery level report concerning the battery of the UE,
      wherein the battery level report is identified in an additional registration request message based on the additional registration request message being parsed by a second device to identify the battery level report and to identify information associated with the UE,
      wherein the additional registration request message is different from an initial registration request message received by the second device,
      wherein a UE profile update request message is generated by the second device based on the information associated with the UE, and
      wherein the UE profile update request message is sent by the second device; and
   sending, by the first device and based on the battery level report, one or more instructions to a third device to allow at least one action to be performed.

2. The method of claim 1, further comprising:
   determining, based on the battery level report, that a battery level of the battery of the UE satisfies a battery level threshold;
   identifying, based on the determining, a scheduled data transmission to or from the UE; and
   sending the one or more instructions to the third device to confirm or cancel the scheduled data transmission.

3. The method of claim 1, further comprising:
   identifying a battery charger associated with the UE; and
   sending the one or more instructions to the battery charger to allow the battery charger to charge the battery of the UE.

4. The method of claim 1, further comprising:
   determining, based on the battery level report, that a battery level of the battery of the UE satisfies a battery level threshold;
   identifying, based on the determining, a scheduled data transmission to or from the UE; and
   confirming the scheduled data transmission based on determining a size of the scheduled data transmission.

5. The method of claim 1, wherein the battery level request message includes at least one of:
   information that identifies the UE, or
   information that indicates a battery level threshold.

6. The method of claim 1, wherein the battery level report is included in the additional registration request message sent from the UE.

7. A device, comprising:
   one or more processors configured to:
      generate, based on profile information of a user equipment (UE) and an initial registration request message received from the UE, a registration accept message that includes a battery level report request concerning a battery of the UE;
      send the registration accept message to the UE;
      receive an additional registration request message that includes a battery level report concerning the battery of the UE;
      identify the battery level report in the additional registration request message,
         wherein the additional registration request message is different from the initial registration request message, and
         wherein identifying the battery level report comprises:
            parsing the additional registration request message to identify the battery level report and information associated with the UE;
            generating, based on the information associated with the UE, a UE profile update request message; and
            sending the UE profile update request message; and
      send the battery level report to another device that allows at least one action to be performed based on the battery level report.

8. The device of claim 7, wherein the one or more processors are further configured to:
   generate, based on receiving the additional registration request message, the UE profile update request message that includes at least one of:
      information that identifies the UE,
      information that indicates one or more capabilities of the UE, or
      information that indicates one or more characteristics of the UE.

9. The device of claim 7, wherein the at least one action to be performed includes at least one of:
   causing the battery of the UE to be recharged by a battery charger, or
   causing a scheduled data transmission to or from the UE to be confirmed or canceled.

10. The device of claim 7, wherein the profile information of the UE indicates a battery level subscription concerning the battery of the UE.

11. The device of claim 7, wherein the battery level report request indicates a battery level threshold.

12. The device of claim 7, wherein the registration accept message is an initial registration accept message, a mobility registration accept message, a periodic registration accept message, or an emergency registration accept message.

13. The device of claim 7, wherein the profile information includes at least one of:
   an identifier of the UE,
   one or more capabilities associated with the UE, one or more characteristics associated with the UE, or a battery level subscription information.

14. A non-transitory computer-readable medium storing instructions, the instructions comprising:
    one or more instructions that, when executed by one or more processors, cause the one or more processors to:
        generate, based on profile information of a user equipment (UE) and an initial registration request message received from the UE, a registration accept message that includes a battery level report request concerning a battery of the UE;
        send the registration accept message to the UE;
        receive an additional registration request message that includes a battery level report concerning the battery of the UE;
        identify the battery level report in the additional registration request message,
        wherein the additional registration request message is different from the initial registration request message, and
        wherein identifying the battery level report comprises:
            parsing the additional registration request message to identify the battery level report and information associated with the UE;
            generating, based on the information associated with the UE, a UE profile update request message; and
            sending the UE profile update request message; and
        send the battery level report to another device that allows at least one action to be performed based on the battery level report.

15. The non-transitory computer-readable medium of claim 14, wherein the one or more instructions, when executed by the one or more processors, further cause the one or more processors to:
    generate, based on receiving the additional registration request message, the UE profile update request message that includes at least one of:
        information that identifies the UE,
        information that indicates one or more capabilities of the UE, or
        information that indicates one or more characteristics of the UE.

16. The non-transitory computer-readable medium of claim 14, wherein the at least one action to be performed includes at least one of:
    causing the battery of the UE to be recharged by a battery charger, or
    causing a scheduled data transmission to or from the UE to be confirmed or canceled.

17. The non-transitory computer-readable medium of claim 14, wherein the profile information of the UE indicates a battery level subscription concerning the battery of the UE.

18. The non-transitory computer-readable medium of claim 14, wherein the battery level report request indicates a battery level threshold.

19. The non-transitory computer-readable medium of claim 14, wherein the registration accept message is an initial registration accept message, a mobility registration accept message, a periodic registration accept message, or an emergency registration accept message.

20. The device of claim 14, wherein the profile information includes at least one of:
    an identifier of the UE,
    one or more capabilities associated with the UE,
    one or more characteristics associated with the UE, or
    a battery level subscription information.

* * * * *